United States Patent [19]

Yamada et al.

[11] Patent Number: 5,600,202
[45] Date of Patent: Feb. 4, 1997

[54] GREEN-EMITTING PHOSPHOR AND CATHODE-RAY TUBE EMPLOYING IT

[75] Inventors: Tsutomu Yamada; Yasuo Oguri; Takashi Hase, all of Odawara; Yasuhiko Uehara, Mobara; Hisashi Toyama, Kokubunji, all of Japan

[73] Assignees: Kasei Optonix, Ltd.; Hitachi Ltd., both of Tokyo, Japan

[21] Appl. No.: 521,492

[22] Filed: Aug. 30, 1995

[51] Int. Cl.$^6$ .............................. H01J 29/10; C09K 11/06
[52] U.S. Cl. .................. 313/467; 313/468; 252/301.4 R
[58] Field of Search ................................ 313/467, 486, 313/487, 468, 488; 252/301.4 R

[56] References Cited

U.S. PATENT DOCUMENTS

| | | | |
|---|---|---|---|
| 4,924,139 | 5/1990 | Morita | 313/468 |
| 5,363,013 | 11/1994 | Matsukiyo | 313/468 |

*Primary Examiner*—Sandra L. O'Shea
*Assistant Examiner*—John Ning
*Attorney, Agent, or Firm*—Pennie & Edmonds

[57] ABSTRACT

A green-emitting phosphor of Tb-activated oxide, which is represented by the compositional formula:

$$(Y_{1-x-y-z}Tb_xYb_yD_z)_3(Al_{1-w}Ga_w)_5O_{12}$$

wherein D is at least one element selected from the group consisting of Sc and La, and x, y, z and w are numbers satisfying the following conditions:

$$1\times10^{-2} \leq x \leq 2\times10^{-1}$$

$$1\times10^{-6} \leq y \leq 2\times10^{-2}$$

$$1\times10^{-4} \leq z \leq 5\times10^{-1}$$

$$0 \leq w \leq 1,$$

and which contains from $1\times10^{-5}$ to $1\times10^{-2}$ gram atom of barium element per mol of the phosphor and is capable of emitting a color within the following range by CIE chromaticity coordinates:

$$0.325 \leq X \leq 0.360$$

$$0.540 \leq Y \leq 0.625.$$

6 Claims, 3 Drawing Sheets

GREEN-EMITTING PHOSPHOR AND CATHODE-RAY TUBE EMPLOYING IT

BACKGROUND OF THE INVENTION

1. Field of the Invention

The present invention relates to a terbium-activated oxide phosphor which exhibits green luminescence under excitation with an electron beam, X-rays, ultraviolet rays, etc., and a cathode-ray tube employing such a phosphor as a fluorescent layer.

2. Discussion of Background

Along with the trend for large size televisions, projection-type televisions have become popular. Cathode-ray tubes used for the projection-type televisions are required to have high luminance for enlarged projection, and they are operated at a high current density as compared with cathode-ray tubes for ordinary televisions. Accordingly, the phosphors used for the cathode-ray tubes for the projection-type televisions are usually required to have a good current luminance characteristic (γ-characteristic), be free from deterioration against excitation for a long period of time and have a good temperature characteristic. Further, in recent years, as refinement of cathode-ray tubes advances, it has been required to reduce the spot of the electron beam for each color more than ever. For the phosphors, this means that the current density increases and the load increases. Therefore, phosphors which are less susceptible to deterioration than the currently available phosphors, are desired.

At present, as phosphors for projection cathode ray tubes, a $Y_2O_3$:Eu phosphor for red, a $Y_3(Al, Ga)_5O_{12}$: Tb phosphor, a $InBO_3$:Tb phosphor, a $Y_3Al_5O_{12}$: Tb phosphor, a $Y_2SiO_5$:Tb phosphor, a LaOCl: Tb phosphor, etc., for green, and a ZnS:Ag,Al phosphor for blue, are used.

The above-mentioned $Y_3(Al,Ga)_5O_{12}$:Tb phosphor is excellent in the current characteristic of luminance such that the luminance increases in proportion to the current density in a low current density range (not higher than 10 μA/cm²) and has excellent temperature characteristics such that the luminance undergoes little change against the temperature change of the phosphor, and it is a phosphor having high luminous efficiency.

However, this $Y_3(Al,Ga)_5O_{12}$: Tb phosphor is not necessarily satisfactory with respect to the life characteristic at a high current density, and a further improvement of the life characteristic has been desired. In order to prevent deterioration of luminance of the phosphor and to prevent saturation of luminance at a high current density, a phosphor has previously been proposed in which a part of Y in the phosphor matrix is substituted by Yb, Tm, Sm, Eu or the like (Japanese Unexamined Patent Publication No. 289679/1990).

SUMMARY OF THE INVENTION

It is an object of the present invention to further improve the luminance-maintaining ratio of the phosphor disclosed in the above publication and to provide a green-emitting phosphor having the color purity improved, and a cathode-ray tube employing it.

The green-emitting phosphor of Tb-activated oxide according to the present invention, is a green-emitting phosphor which is represented by one of the following compositional formulas:

(1) $(Y_{1-x-y-z}Tb_xYb_yD_z)_3(Al_{1-w}Ga_w)_5O_{12}$ wherein D is at least one element selected from the group consisting of Sc and La, and x, y, z and w are numbers satisfying the following conditions:

$1\times10^{-2} \leq x \leq 2\times10^{-1}$ $1\times10^{-6} \leq y \leq 2\times10^{-2}$ $1\times10^{-4} \leq z \leq 5\times10^{-1}$ $0 \leq w \leq 1$;

(2) $(Y_{1-x-y-z}Tb_xSm_yD_z)_3(Al_{1-w}Ga_w)_5O_{12}$ wherein D is at least one element selected from the group consisting of Sc and La, and x, y, z and w are numbers satisfying the following conditions:

$1\times10^{-2} \leq x \leq 2\times10^{-1}$ $1\times10^{-6} \leq y \leq 1\times10^{-3}$ $1\times10^{-4} \leq z \leq 5\times10^{-1}$ $0 \leq w \leq 1$; and (3) $(Y_{1-x-y-z}Tb_xEu_yD_z)_3(Al_{1-w}Ga_w)_5O_{12}$ wherein D is at least one element selected from the group consisting of Sc and La, and x, y, z and w are numbers satisfying the following conditions:

$1\times10^{-2} \leq x \leq 2\times10^{-1}$ $1\times10^{-6} \leq y \leq 3\times10^{-4}$ $1\times10^{-4} \leq z \leq 5\times10^{-1}$ $0 \leq w \leq 1$, and which contains from $1\times10^{-5}$ to $1\times10^{-2}$ gram atom of barium element per mol of the phosphor and is capable of emitting a color within the following range by CIE chromaticity coordinates:

$0.325 \leq X \leq 0.360$ $0.540 \leq Y \leq 0.625$.

Further, the cathode-ray tube of the present invention is a cathode-ray tube comprising a faceplate, a fluorescent layer of a green-emitting phosphor formed on the inner surface of the faceplate, an electron gun for emitting an electron beam to the fluorescent layer to excite the green-emitting phosphor for emission, and a control means for scanning the electron beam emitted from the electron gun, wherein the green-emitting phosphor is as defined above.

BRIEF DESCRIPTIONS OF THE DRAWINGS

FIG. 1 is a graph showing the relation between the operation time and the relative luminance with respect to cathode-ray tubes employing a $(Y_{0.92818}Tb_{0.07}Yb_{0.00012}Sc_{0.0017})_3(Al_{0.63}Ga_{0.37})_5O_{12}$ phosphor a containing $2\times10^{-4}$ gram atom of Ba per mol of the phosphor, a $(Y_{0.92918}Tb_{0.07}Yb_{0.00012}La_{0.0007})_3(Al_{0.63}Ga_{0.37})_5O_{12}$ phosphor b containing $2\times10^{-4}$ gram atom of Ba per mol of the phosphor and a $(Y_{0.92988}Tb_{0.07}Yb_{0.00012})_3(Al_{0.63}Ga_{0.37})_5O_{12}$ phosphor c, respectively, as fluorescent layers.

DETAILED DESCRIPTION OF THE PREFERRED EMBODIMENTS

The phosphor of the present invention can be prepared as follows.

The raw materials for the phosphor are:

① an yttrium compound such as yttrium oxide or yttrium nitrate,

② a terbium compound such as terbium oxide or terbium nitrate,

③ an ytterbium compound such as ytterbium oxide or ytterbium nitrate,

④ a samarium compound such as samarium oxide or samarium nitrate,

⑤ a europium compound such as europium oxide or europium nitrate,

⑥ a scandium compound such as scandium oxide or scandium nitrate,

⑦ a lanthanum compound such as lanthanum oxide or lanthanum nitrate,

⑧ an aluminum compound such as aluminum oxide, aluminum hydroxide or aluminum nitrate, ⑨ a gallium compound such as gallium oxide or gallium nitrate, and ⑩ a barium compound such as barium carbonate, barium fluoride or barium chloride.

Such raw materials are sampled within the ranges of the compositional formula and within the range of the amount of barium to be incorporated, and blended, if necessary, using an alkali metal and/or alkaline earth metal halide as flux, and the mixture is thoroughly mixed in a wet or dry system. Further, the rare earth raw materials may be mixed to one another by coprecipitation.

The mixture is filled in a heat resistant container such as a crucible and fired in air or in a neutral atmosphere at least once at a temperature of from 800 to 1600° C. for 1 to 12 hours. During the firing step, the temperature is raised to a level of at least 1300° C. at least once. This fired product is subjected to pulverization, washing with a mineral acid, washing with water, drying and sieving to obtain the green-emitting phosphor of the present invention.

The present inventors have conducted extensive studies to further improve the luminance-maintaining ratio and the emission luminance of the previously proposed $(Y,M)_3(Al,Ga)_5O_{12}$:Tb phosphor (M=Yb, Tm, Sm or Eu), and as a result, have succeeded in obtaining a green-emitting phosphor suitable for the above objects by substituting a part of Y by at least one element selected from the group consisting of Sc or La and incorporating Ba.

Figure 1:
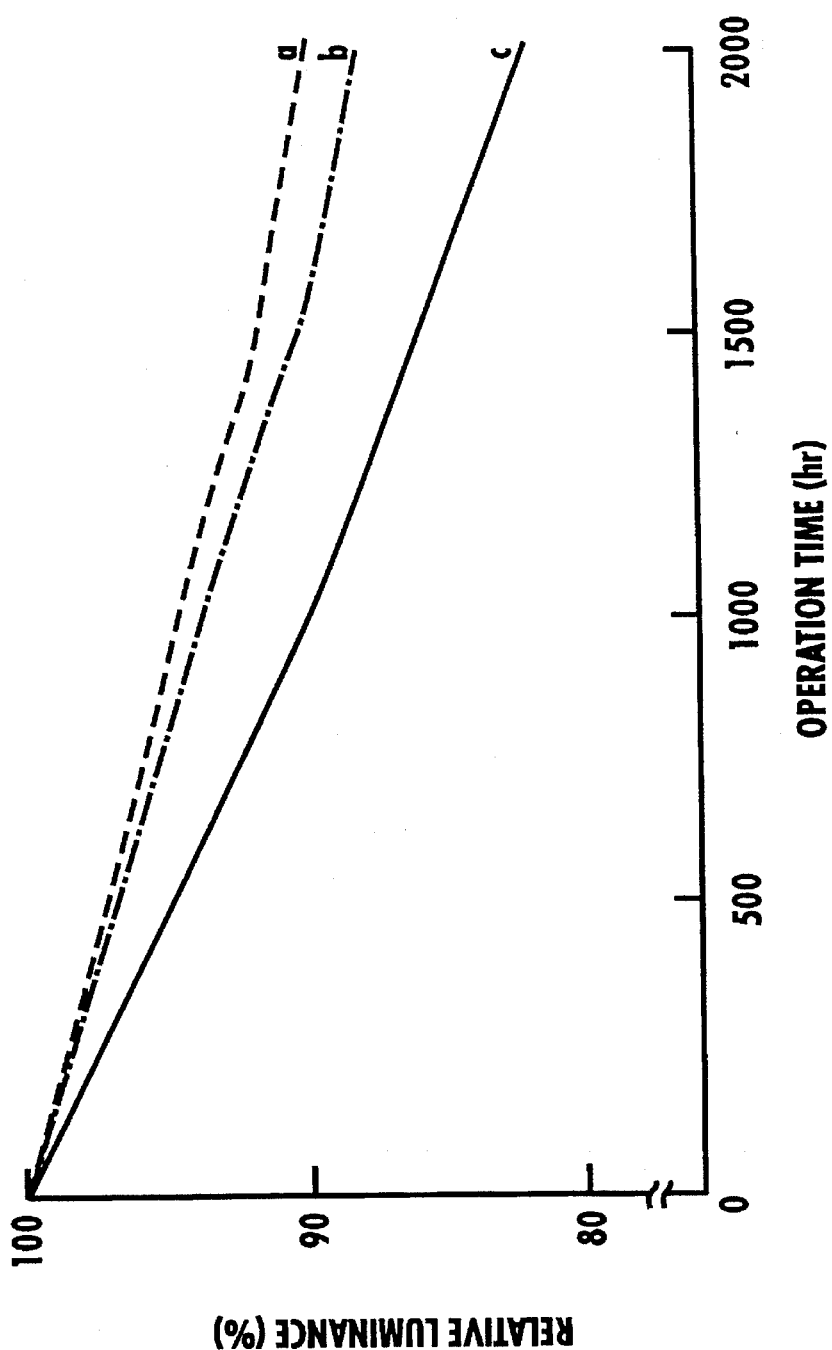

FIG. 1 is a graph showing the results of measurement of relative luminance of cathode-ray tubes prepared by using the Sc-substituted phosphor (a), the La-substituted phosphor (b) and the non-substituted phosphor (c), respectively, as fluorescent layers and operated for 2000 hours under an electron beam acceleration condition of 20 KV and 10 $\mu A/cm^2$ for emission. In the Figure, a represents a case where Ba was incorporated in an amount of $2\times10^{-4}$ gram atom per mol of the $(Y_{0.92818}Tb_{0.07}Yb_{0.00012}Sc_{0.0017})_3(Al_{0.63}Ga_{0.37})_5O_{12}$ phosphor, b represents a case where Ba was incorporated in an amount of $2\times10^{-4}$ gram atom per mol of the $(Y_{0.92818}Tb_{0.07}Yb_{0.00012}La_{0.0017})_3(Al_{0.63}Ga_{0.37})_5O_{12}$ phosphor, and c represents a case of a green-emitting phosphor containing $2\times10^{-4}$ gram atom of Ba per mol of the $(Y_{0.92988}Tb_{0.07}Yb_{0.00012})_3(Al_{0.063}Ga_{0.37})_5O_{12}$ phosphor.

As is evident from FIG. 1, the phosphor a or b containing Sc or La, and Ba, according to the present invention, has a relative luminance after 2000 hours higher by about 8% or 5%, respectively, than the phosphor c containing only Ba, and the luminance maintaining ratio is improved.

Further, if addition of Ba is omitted, the resulting phosphor tends to be small in particle size and susceptible to aggregation. By the addition of Ba, growth of the particles will be promoted, whereby a phosphor having high emission luminance can be obtained.

Figure 2:
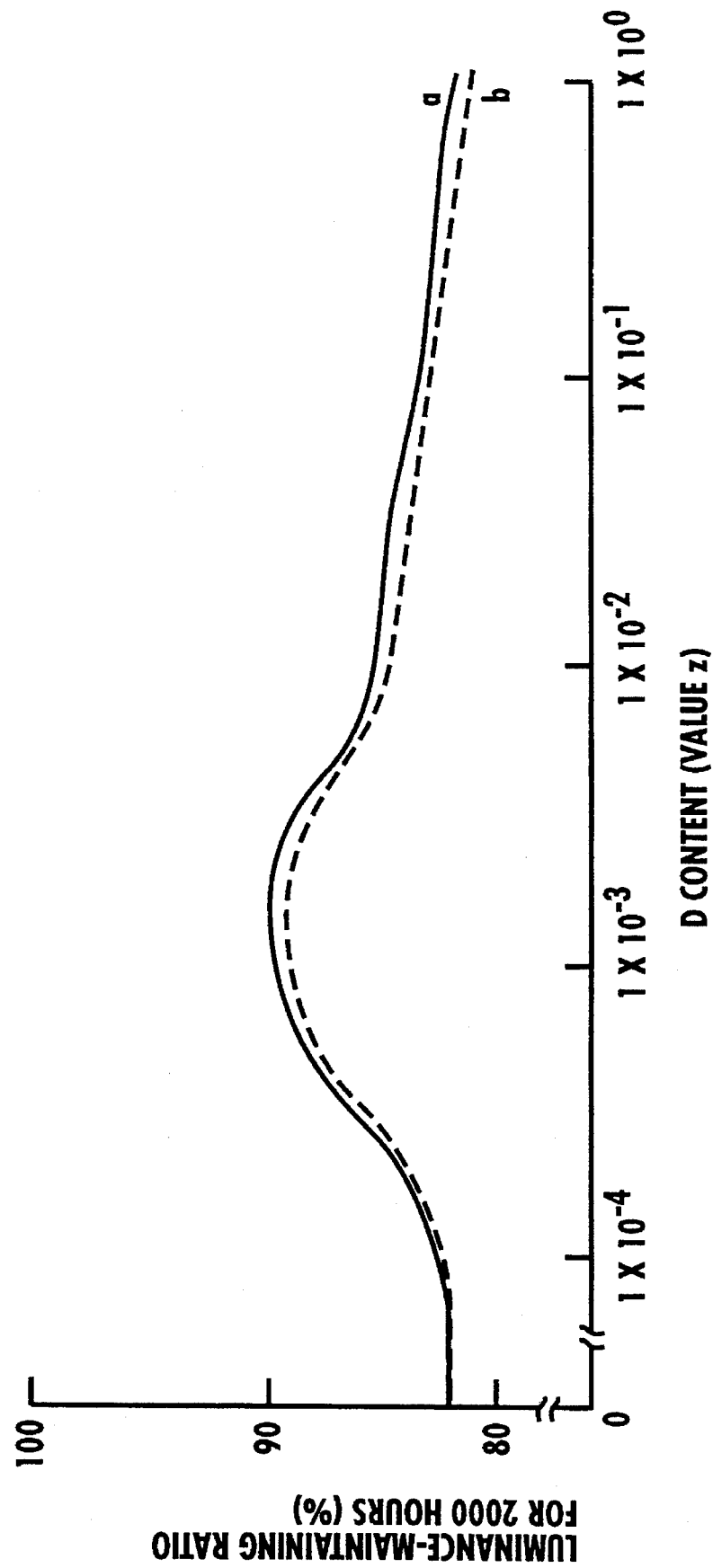
FIG. 2 is a graph showing the relation between the Sc or La content (the z value) of the phosphor a or b in the cathode-ray tube wherein a $(Y_{0.92988-z}Tb_{0.07}Yb_{0.00012}D_z)_3(Al_{0.63}Ga_{0.37})_5O_{12}$ containing $2\times10^{-4}$ gram atom of Ba per mol of the phosphor, was used as the fluorescent layer.

FIG. 2 is a graph showing the results of measurement of the luminance-maintaining ratios, when cathode-ray tubes having fluorescent layers made of phosphors having the D content (value z) varied in the $(Y_{0.92988-z}Tb_{0.07}Yb_{0.00012}D_z)_3(Al_{0.63}Ga_{0.37})_5O_{12}$ phosphor containing $2\times10^{-4}$ gram atom of Ba per mol of the phosphor, were operated for 2000 hours under an electron beam accelerating condition of 20 KV and 10 $\mu A/cm^2$ for emission.

As is apparent from FIG. 2, when the Sc or La content (value z) is within a range of from about $1\times10^{-4}$ to $5\times10^{-1}$, the luminance-maintaining ratio of the phosphor is high. If the value z is less than $1\times10^{-4}$ there will be no effect for improvement of the life, and if it exceeds $5\times10^{-1}$, the luminance tends to be low.

Further, with respect to a $(Y_{1-x-y-z}Tb_xLn_yD_z)_3(Al_{1-w}Ga_w)_5O_{12}$ (wherein Ln is Sm or Eu) phosphor other than the $(Y_{0.92988-z}Tb_{0.07}Yb_{0.00012}D_z)_3(Al_{0.63}Ga_{0.37})_5O_{12}$ phosphor, the luminance-maintaining ratio was examined by varying the Sc content in the same manner as in FIG. 2, whereby it was confirmed that an interrelation similar to that in FIG. 2 was shown. Furthermore, characteristics similar to the above are shown also when at least one of Gd and Lu is contained as a part of the phosphor.

In the green-emitting phosphor of the present invention, the crystal growth of the phosphor matrix will be promoted by the incorporation of Ba, and diffusion into the matrix of the activating element constituting the emission center tends to readily proceed, whereby the emission luminance can further be improved. Further, to obtain a phosphor having a predetermined level of emission luminance, the firing temperature of the phosphor can be further lowered. In order to obtain such effects of incorporation of Ba, it is preferred to incorporate Ba in an amount within a range of from $1\times10^{-5}$ to $1\times10^{-2}$ gram atom per mol of the phosphor.

Further, the Tb concentration (value x) of the green-emitting phosphor of the present invention is preferably within a range of $1\times10^{-2} \leq x \leq 2\times10^{-1}$, so that the luminescent chromaticity coordinates (X, Y) for a preferred green-color range are within the ranges of $0.325 \leq X \leq 0.360$ and $0.540 \leq Y \leq 0.625$ to exhibit emission of high luminance.

The phosphor of the present invention exhibits green-color emission of high luminance even under excitation with ultraviolet rays or X-rays, and thus it is useful for lamps or for X-rays.

Figure 4:
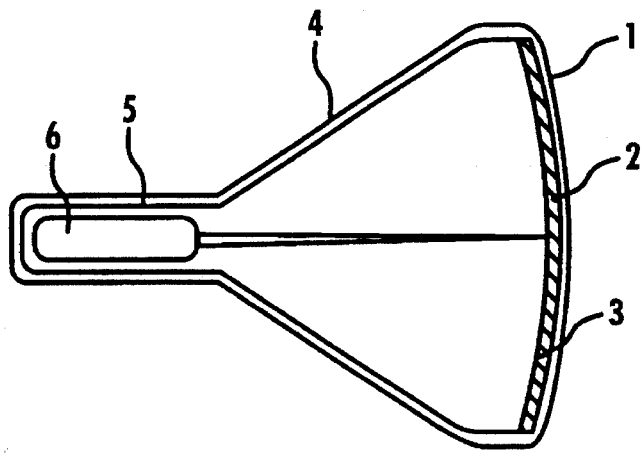
FIG. 4 is a cross-sectional view illustrating the cathode-ray tube of the present invention.

One embodiment of a cathode-ray tube according to the present invention is shown in FIG. 4. On the inner surface of the faceplate 1, the above phosphor is coated to form a fluorescent layer 2. An aluminum vapor-deposited layer 3 is formed thereon, and an electron gun 6 is provided at the neck tube 5. This cathode ray tube is designed so that the electron beam emitted from the electron gun 5 passes through the aluminum vapor-deposited layer 3 to irradiate the fluorescent layer 2 to excite the phosphor for emission.

Now, the present invention will be described in further detail with reference to Examples. However, it should be understood that the present invention is by no means restricted to such specific Examples.

EXAMPLE 1

| | |
|---|---|
| $Y_2O_3$ | 314 g |
| $Tb_4O_7$ | 39 g |
| $Yb_2O_3$ | 0.069 g |
| $Sc_2O_3$ | 0.351 g |
| $Al_2O_3$ | 160 g |
| $Ga_2O_3$ | 174 g |
| $BaF_2$ | 18 g |

The above raw materials were thoroughly mixed and packed into an alumina crucible, followed by firing in air at 1500° C. for 2 hours. The obtained fired product was subjected to pulverization, washing with an acid, washing with water, drying and sieving to obtain a phosphor.

This phosphor was a $(Y_{0.929818}Tb_{0.07}Yb_{0.00012}Sc_{0.0017})_3(Al_{0.63}Ga_{0.37})_5O_{12}$ containing $2\times10^{-4}$ g.atom/mol of Ba.

Figure 3:
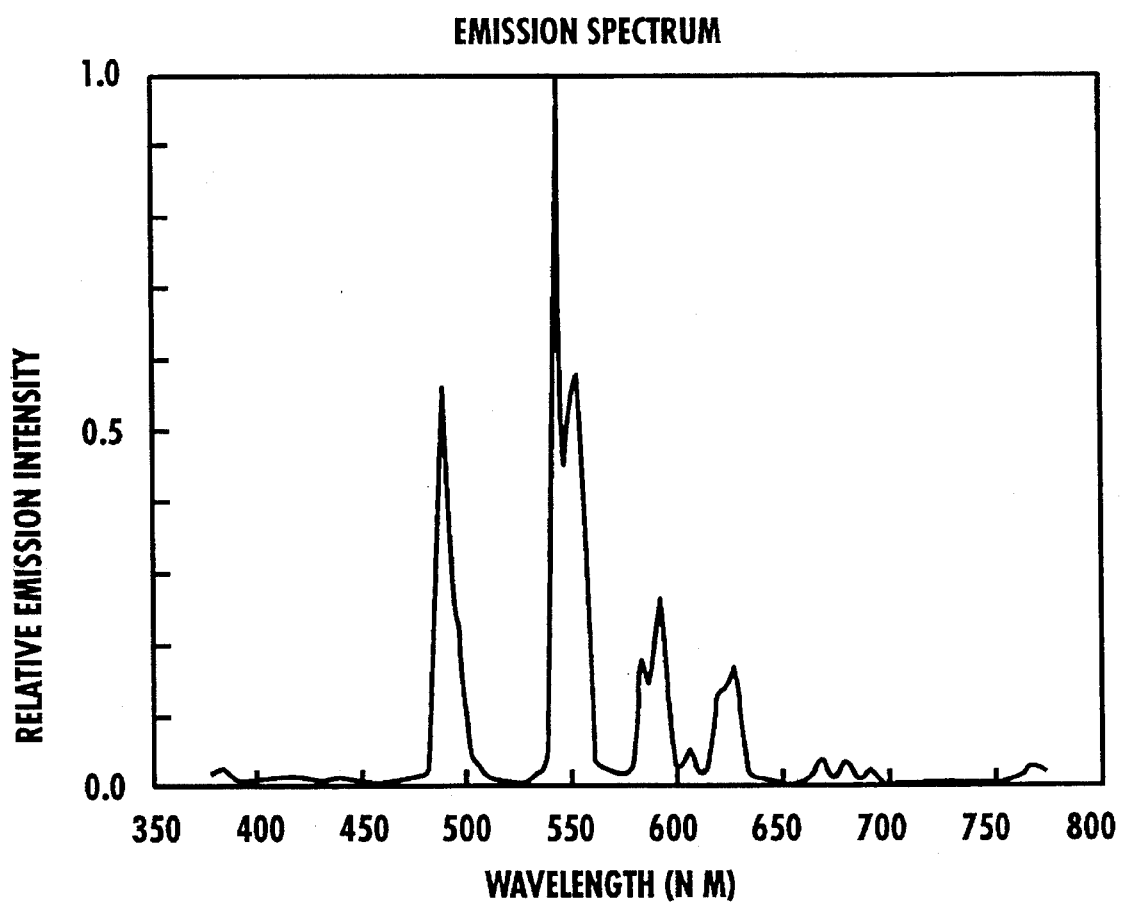
FIG. 3 is a graph showing the emission spectrum of the phosphor a in FIG. 1.

This phosphor was precipitation-coated on a cathode-ray tube of 18 cm (7 inch) so that the layer thickness would be 6 mg/cm$^2$, and then an electromagnetic convergence type electron gun was attached, followed by vacuum sealing to obtain a cathode-ray tube (projection cathode-ray tube). Then, the cathode-ray tube was continuously operated by irradiating an electron beam under an accelerating voltage of 20 KV at a current density of 10 μA/cm$^2$ to excite the fluorescent layer for emission, whereby the luminance-maintaining ratio after 2000 hours (the relative percentage of emission luminance after irradiation for 2000 hours to the emission luminance immediately after initiation of the electron beam irradiation) and the chromaticity coordinates of the emitted color are shown in Table 1 together with the composition of the phosphor. Further, FIG. 3 shows the emission spectrum of this phosphor.

EXAMPLES 2 to 16

$Y_2O_3$, $Tb_4O_7$, $Yb_2O_3$, $Sm_2O_3$ (Examples 7 and 15), $Eu_2O_3$ (Examples 8 and 16), $Sc_2O_3$, $La_2O_3$, $Al_2O_3$, $Ga_2O_3$ and $BaF_2$ were mixed in the proportions so that the compositional formula would be as shown in Table 1, and in the same manner as in Example 1, green-emitting phosphors of Examples 2 to 16 containing $2\times10^{-4}$ g.atom/mol of Ba, were obtained. Cathode-ray tubes (projection cathode-ray tubes) having fluorescent layers made of such phosphors were prepared and operated for 2000 hours in the same manner as in Example 1, whereupon the luminance-maintaining ratios and the chromaticity coordinates of the emitted colors were measured. The results are shown in Table 1.

COMPARATIVE EXAMPLE 1

A phosphor was prepared in the same manner as in Example 1 except that $Sc_2O_3$ or $La_2O_3$ was omitted. The obtained phosphor was $(Y_{0.92988}Tb_{0.07}Yb_{0.00012})_3(Al_{0.63}Ga_{0.37})_5O_{12}$ containing $2\times10^{-4}$ g.atom/mol of Ba. In the same manner as in Example 1, a cathode-ray tube (projection cathode-ray tube) having a fluorescent layer made of this phosphor was prepared, and operated for 2000 hours in the same manner as in Example 1, whereupon the luminance-maintaining ratio and the chromaticity coordinates of the emitted color were measured. The results are shown in Table 1.

TABLE 1

| | Compositional formula | Luminance-maintaining ratio | Chromaticity X | Chromaticity Y |
|---|---|---|---|---|
| Example 1 | $(Y_{0.92818}Tb_{0.07}Yb_{0.00012}Sc_{0.0017})_3A_5O_{12}$ | 90% | 0.353 | 0.554 |
| Example 2 | $(Y_{0.92971}Tb_{0.07}Yb_{0.00012}Sc_{0.00017})_3A_5O_{12}$ | 84% | 0.353 | 0.554 |
| Example 3 | $(Y_{0.9292}Tb_{0.07}Yb_{0.00012}Sc_{0.00068})_3A_5O_{12}$ | 86% | 0.353 | 0.554 |
| Example 4 | $(Y_{0.92648}Tb_{0.07}Yb_{0.00012}Sc_{0.0034})_3A_5O_{12}$ | 86% | 0.353 | 0.554 |
| Example 5 | $(Y_{0.92308}Tb_{0.07}Yb_{0.00012}Sc_{0.0068})_3A_5O_{12}$ | 85% | 0.353 | 0.554 |
| Example 6 | $(Y_{0.91280}Tb_{0.07}Yb_{0.00012}Sc_{0.017})_3A_5O_{12}$ | 87% | 0.353 | 0.554 |
| Example 7 | $(Y_{0.92817}Tb_{0.07}Sm_{0.00012}Sc_{0.00171})_3A_5O_{12}$ | 85% | 0.353 | 0.554 |
| Example 8 | $(Y_{0.92817}Tb_{0.07}Eu_{0.00012}Sc_{0.00171})_3A_5O_{12}$ | 84% | 0.353 | 0.554 |
| Example 9 | $(Y_{0.92918}Tb_{0.07}Yb_{0.00012}La_{0.0007})_3A_5O_{12}$ | 87% | 0.353 | 0.554 |
| Example 10 | $(Y_{0.92981}Tb_{0.07}Yb_{0.00012}La_{0.00007})_3A_5O_{12}$ | 84% | 0.353 | 0.554 |
| Example 11 | $(Y_{0.92948}Tb_{0.07}Yb_{0.00012}La_{0.0004})_3A_5O_{12}$ | 86% | 0.353 | 0.554 |
| Example 12 | $(Y_{0.92848}Tb_{0.07}Yb_{0.00012}La_{0.0014})_3A_5O_{12}$ | 86% | 0.353 | 0.554 |
| Example 13 | $(Y_{0.92708}Tb_{0.07}Yb_{0.00012}La_{0.0028})_3A_5O_{12}$ | 85% | 0.353 | 0.554 |
| Example 14 | $(Y_{0.92748}Tb_{0.07}Yb_{0.00012}La_{0.0007}Sc_{0.0017})_3A_5O_{12}$ | 87% | 0.353 | 0.554 |
| Example 15 | $(Y_{0.92910}Tb_{0.07}Sm_{0.00012}La_{0.0007})_3A_5O_{12}$ | 85% | 0.353 | 0.554 |
| Example 16 | $(Y_{0.92910}Tb_{0.07}Eu_{0.00012}La_{0.0007})_3A_5O_{12}$ | 84% | 0.353 | 0.554 |
| Comparative Example 1 | $(Y_{0.92988}Tb_{0.07}Yb_{0.00012})_3A_5O_{12}$ | 82% | 0.353 | 0.554 |

The above phosphors contained $2\times10^{-4}$ g.atom/mol of Ba in addition to the compositions in the Table, and A in the Table represents $(Al_{0.63}Ga_{0.37})$.

Evaluation

It is evident from Table 1, cathode-ray tubes (projection cathode-ray tubes) having fluorescent layers made of green-emitting phosphors of Examples 1 to 8 containing La or Sc, have the luminance-maintaining ratios after the operation for 2000 hours remarkably improved as compared with the cathode-ray tube (projection cathode-ray tube) having a fluorescent layer made of the green-emitting phosphor of Comparative Example 1 containing no La or Sc, and their color purity was also excellent.

COMPARATIVE EXAMPLE 2

A $(Y_{0.92818}Tb_{0.07}Yb_{0.00012}Sc_{0.0017})_3(Al_{0.63}Ga_{0.37})_5O_{12}$ phosphor containing no Ba, was prepared in the same manner as in Example 1 except that $BaF_2$ was omitted. Using this phosphor, a cathode-ray tube (projection cathode-ray tube) was prepared, and the emission luminance (initial luminance) immediately after the operation, was measured in the same manner as in Example 1, whereby the emission luminance was very low at a level of about 65% of the cathode-ray tube (projection cathode-ray tube) of Example 1. Therefore, no test for measuring the luminance-maintaining ratio was carried out. The same was true also with respect to La.

The green-emitting phosphor and the cathode-ray tube of the present invention are excellent in the life characteristics and have emission characteristics with a good color purity.

What is claimed is:

1. A green-emitting phosphor of Tb-activated oxide, which is represented by the compositional formula:

$$(Y_{1-x-y-z}Tb_xYb_yD_z)_3(Al_{1-w}Ga_w)_5O_{12}$$

wherein D is at least one element selected from the group consisting of Sc and La, and x, y, z and w are numbers satisfying the following conditions:

$1\times10^{-2} \leq x \leq 2\times10^{-1}$ $1\times10^{-6} \leq y \leq 2\times10^{-2}$ $1\times10^{-4} \leq z \leq 5\times10^{-1}$ $0 \leq w \leq 1$, and which contains from $1\times10^{-5}$ to $1\times10^{-2}$ gram atom of barium element per mol of the phosphor and is capable of emitting a color within the following range by CIE chromaticity coordinates:

$0.325 \leq X \leq 0.360$ $0.540 \leq Y \leq 0.625$.

2. A green-emitting phosphor of Tb-activated oxide, which is represented by the compositional formula:

$$(Y_{1-x-y-z}Tb_xSm_yD_z)_3(Al_{1-w}Ga_w)_5O_{12}$$

wherein D is at least one element selected from the group consisting of Sc and La, and x, y, z and w are numbers satisfying the following conditions:

$1\times10^{-2} \leq x \leq 2\times10^{-1}$ $1\times10^{-6} \leq y \leq 2\times10^{-3}$ $1\times10^{-4} \leq z \leq 5\times10^{-1}$ $0 \leq w \leq 1$, and which contains from $1\times10^{-5}$ to $1\times10^{-2}$ gram atom of barium element per mol of the phosphor and is capable of emitting a color within the following range by CIE chromaticity coordinates:

$0.325 \leq X \leq 0.360$ $0.540 \leq Y \leq 0.625$.

3. A green-emitting phosphor of Tb-activated oxide, which is represented by the compositional formula: $(Y_{1-x-y-z}Tb_xEu_yD_z)_3(Al_{1-w}Ga_w)_5O_{12}$ wherein D is at least one element selected from the group consisting of Sc and La, and x, y, z and w are numbers satisfying the following conditions:

$1\times10^{-2} \leq x \leq 2\times10^{-1}$ $1\times10^{-6} \leq y \leq 3\times10^{-4}$ $1\times10^{-4} \leq z \leq 5\times10^{-1}$ $0 \leq w \leq 1$, and which contains from $1\times10^{-5}$ to $1\times10^{-2}$ gram atom of barium element per mol of the phosphor and is capable of emitting a color within the following range by CIE chromaticity coordinates:

$0.325 \leq X \leq 0.360$ $0.540 \leq Y \leq 0.625$.

4. A cathode-ray tube comprising a faceplate, a fluorescent layer of a green-emitting phosphor formed on the inner surface of the faceplate, an electron gun for emitting an electron beam to the fluorescent layer to excite the green-emitting phosphor for emission, and a control means for scanning the electron beam emitted from the electron gun, wherein the green-emitting phosphor is as defined in claim 1.

5. A cathode-ray tube comprising a faceplate, a fluorescent layer of a green-emitting phosphor formed on the inner surface of the faceplate, an electron gun for emitting an electron beam to the fluorescent layer to excite the green-emitting phosphor for emission, and a control means for scanning the electron beam emitted from the electron gun, wherein the green-emitting phosphor is as defined in claim 2.

6. A cathode-ray tube comprising a faceplate, a fluorescent layer of a green-emitting phosphor formed on the inner surface of the faceplate, an electron gun for emitting an electron beam to the fluorescent layer to excite the green-emitting phosphor for emission, and a control means for scanning the electron beam emitted from the electron gun, wherein the green-emitting phosphor is as defined in claim 3.

* * * * *